Nov. 10, 1925.  
G. J. SCHAFFER  
1,560,916  
FIRE PREVENTING DEVICE FOR MOTION PICTURE PROJECTION MACHINES  
Filed June 29, 1922  
2 Sheets-Sheet 2
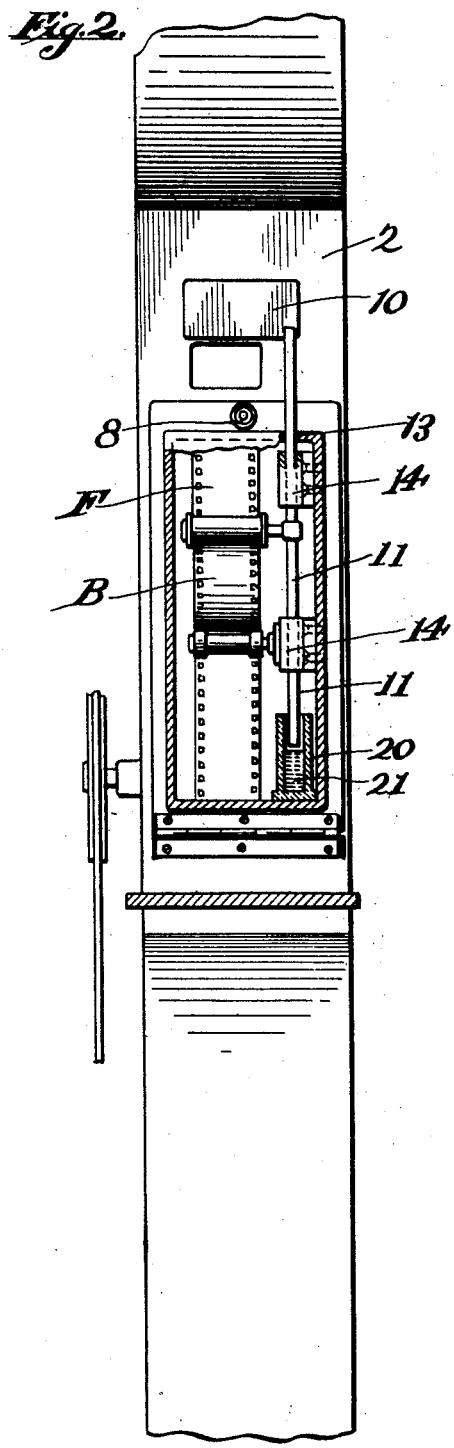
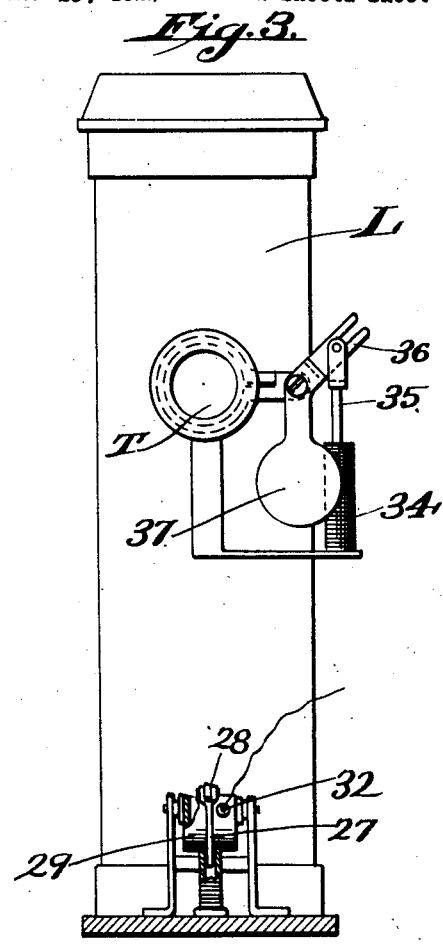
Inventor:  
GEORGE J. SCHAFFER.  
By Hazard & Miller  
Attorneys.

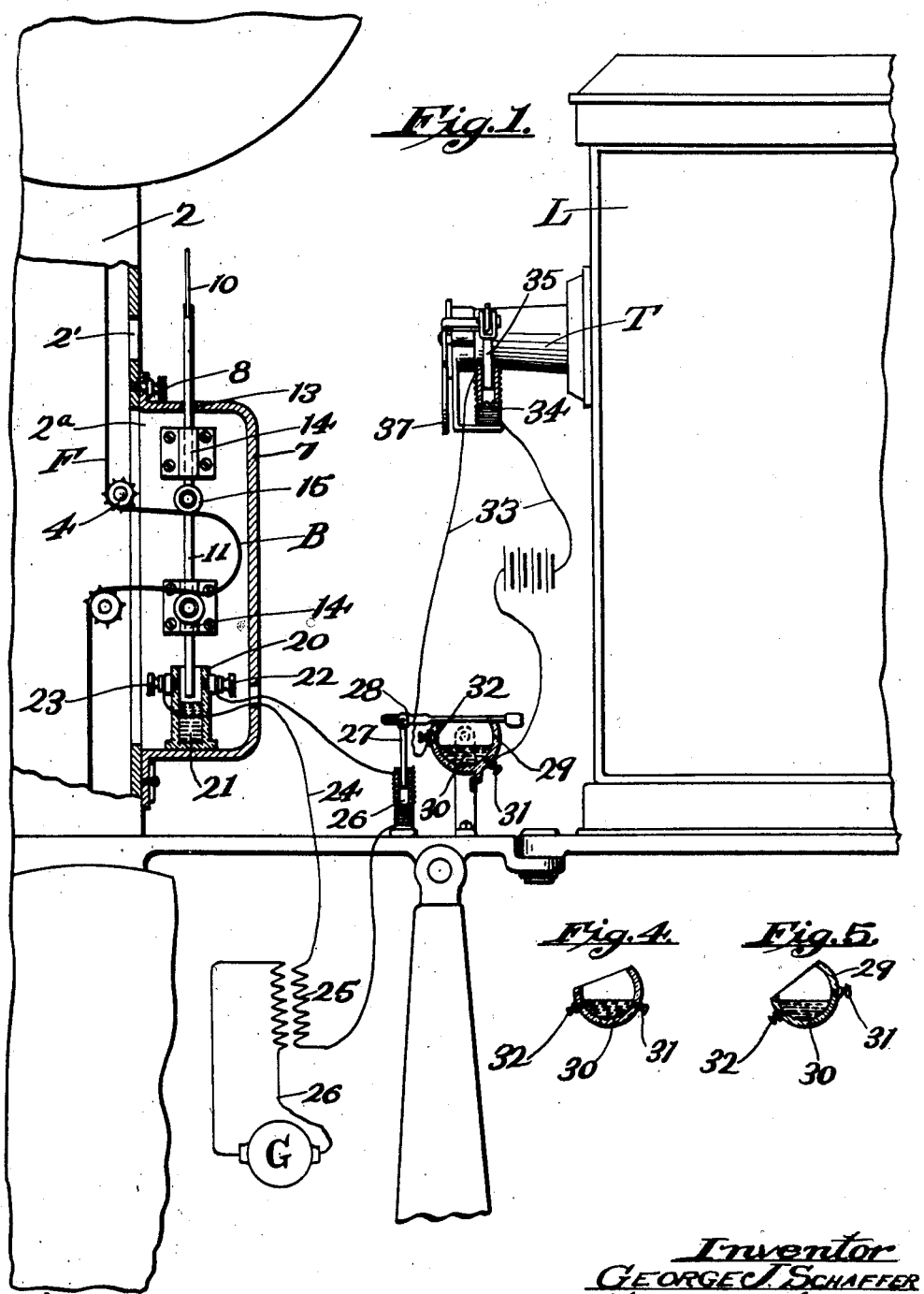

Patented Nov. 10, 1925.

1,560,916

UNITED STATES PATENT OFFICE.

GEORGE J. SCHAFFER, OF LOS ANGELES, CALIFORNIA.

FIRE-PREVENTING DEVICE FOR MOTION-PICTURE-PROJECTION MACHINES.

Application filed June 29, 1922. Serial No. 571,607.

*To all whom it may concern:*

Be it known that I, GEORGE J. SCHAFFER, a citizen of the United States, residing at Los Angeles, in the county of Los Angeles and State of California, have invented new and useful Improvements in Fire-Preventing Devices for Motion-Picture-Projection Machines, of which the following is a specification.

This invention relates to motion picture projectors of the type using a highly concentrated beam of light for projecting a picture image from a traveling film. This film is usually of highly inflammable character, and an object of the present invention is to provide means for automatically dowsing or cutting off the beam of light passing through the light aperture in the projecting apparatus in the event that the film breaks and becomes stationary in the beam of light.

A further object is to provide an automatic dowser of extremely simple and reliable construction and which may be incorporated with the standard equipment of the machine with but very slight change and addition of elements.

Other objects will be made manifest in the following specification of an embodiment of the invention illustrated in the accompanying drawings, in which Figure 1 is a side elevation of a fragment of the projection apparatus, a part of which is shown in section and with which the invention is combined.

Fig. 2 is a side elevation and partial section at right angles to the plane of Fig. 1.

Fig. 3 is an end view of the lamp housing showing the light shutter in the open position and showing the shutter controlling mercury pot.

Fig. 4 is a diagrammatic section showing the tiltable mercury pot in circuit closing position.

Fig. 5 is a similar diagrammatic view showing the mercury pot in the circuit breaking position.

A portion of a projecting machine housing is indicated at 2, and one wall of this housing is provided with a light aperture 2' in front of which a motion picture film strip F is intermittently advanced during the passage of a beam of light through the aperture 2'. The film passes over a pair of sprocket wheels 4—4 which are spaced somewhat in front of an opening 2ª in the rear wall of the housing 2 so that a portion of the film F forms a loop or bight which may project through the opening 2ª and is protected and covered by a pocket forming wall or plate 7 which may be secured in a closed position as by a fastening screw 8 at its upper end.

It is highly desirable to instantly cut off a beam of light passing through the aperture 2' in the event that the film F should break at a point below the upper sprocket wheel 4, because in such emergency the film F becomes stationary in front of the aperture 2' and will become ignited by the concentrated beam.

My present invention consists in providing a dowser or cut off device in the form of a shutter which may consist of a plate 10 secured upon a vertically extending rod 11 which projects through the upper end of the cover 7 and holds the dowser 10 normally in an elevated position with respect to the aperture 2. The rod 11 passes through an aperture 13 in the top of the cover 7 and extends therethrough into the loop chamber. On one wall of the cover there is provided bearings 14 in which the rod is slidably mounted.

Attached to the lower portion of the rod and extending perpendicularly thereto and in substantial parallelism with the upper roller 4 is a presser roller 15 which preferably has flanged ends.

In operation of the device, the presser roller is lifted and a bight B is formed in the film F, and this bight projects into the loop chamber. The presser roller 15 is then lowered so as to bear upon the upper portion of the bight. In the event that the film F breaks, the supporting bight under the roller 15 is therefore eliminated and this permits the roller 15 with its connected dowser 10 to descend to such a position as to bring the dowser into covering position over the light aperture 2'.

The dowser is utilized in my present invention as a means for controlling the automatic cutting off of the beam of light coming from the lamp house L of the apparatus so that after the dowser 10 has fallen to its effective position over the aperture 2', the beam of light from the lamp house L is intercepted and the dowser is prevented from being heated by the beam; which heating would result in the probable ignition of the film.

The lower end of the dowser is designed to effect the closing of a circuit for causing the closing of a supplementary circuit in which is provided means for stopping the beam of light at the lamp box.

The lower end of the dowser rod 11 is designed to enter a mercury pot 20 in which is a bath of mercury 21, the displacement of which, by the entry of the rod 11, raises the level of the mercury to such degree as to close a circuit through spaced contacts or terminals 22 and 23 provided in the sides of the mercury pot 20. The terminals 22—23 have connection with a transforming circuit including the wires 24 having a transformer coil 25 which may be associated with a primary coil in a generator circuit 26. The low voltage produced in the circuit 24 is utilized to energize a solenoid 26, the core 27 of which is connected to a lever 28. This lever is attached to a tiltable mercury pot 29.

In the normal position of the mercury pot 29, a bath of mercury therein is in covering contact with a bottom terminal 31 but is out of contact with a side terminal 32 as seen in Fig. 1.

The terminals 31 and 32 are electrically connected to a circuit including wires 33 and including a solenoid coil 34. In the solenoid is a core 35 attached to a bell crank or lever arm 36. At one end of the bell crank 36 is a shutter or light stop 37 normally in a pendent position uncovering the tube T arranged at the front of the lamp box L.

In operation of the mechanism when the film loop breaks in the film chamber, the dowser 10 is lowered and its rod plunges into the merucy bath 21 and this closes an electrical circuit at the opposite contacts 22 and 23. This closed circuit therefore energizes the solenoid 26 and the lever arm 28 is pulled down and thus tilts the mercury pot 29. In the tilting movement the contacts 31 and 32 swing into concurrent electrical contact with the bath of mercury 30 as shown in Fig. 4. Thereupon the circuit 33 is closed, and the solenoid 34 being energized operates the bell crank 36 and shifts the light stop or shutter 37 up to covering position over the light tube T in which position it will remain until the operator again restores the shutter 37 to its open position and repairs the film so that it will support the dowser 10 in elevated position.

The shutter controlling circuit 33 is momentarily energized by the tilting action of the mercury pot 29 during the rotation of which, after the circuit 33 has been closed then the contacts 31 and 32 are so shifted relative to the mercury that the circuit 33 is broken when the mercury pot 29 reaches the position shown in Fig. 5 in which position it will be maintained so long as the solenoid 26 is energized by the closure of the circuit at the mercury pot 20 in which the lower end of the dowser rod 11 has descended.

The weight of the solenoid parts will hold the shutter 37 up, and it is opened by hand.

Various modifications and changes may be resorted to within the spirit of the invention as claimed.

What is claimed is:

1. In a motion picture projecting apparatus having a light aperture adjacent which a motion picture film is designed to pass, means for intercepting a beam of light passing through the light aperture, said means including a vertically slidable rod, a presser member carried by said rod adapted to rest upon the upper portion of a bight continuously formed during the advance of the picture film, and a plate carried by said rod, said presser member, rod and plate being adapted to fall in the event of the breaking of the film, causing the destruction of said bight whereby said plate may cover said light aperture.

2. In a motion picture projecting apparatus having a light aperture adjacent which a motion picture film is designed to pass, means for intercepting a beam of light passing through the light aperture, said means including a vertically slidable rod, a presser roller carried by said rod adapted to rest upon the upper portion of a bight continuously formed during the advance of the picture film, and a plate carried by said rod, said presser roller, rod and plate being adapted to fall in the event of the breaking of the film, causing the destruction of said bight whereby said plate may cover said light aperture.

In testimony whereof I have signed my name to this specification.

GEORGE J. SCHAFFER.